Dec. 3, 1957     B. W. RECHNITZER     2,815,479
HIGH VOLTAGE SUPPLY
Filed June 1, 1954
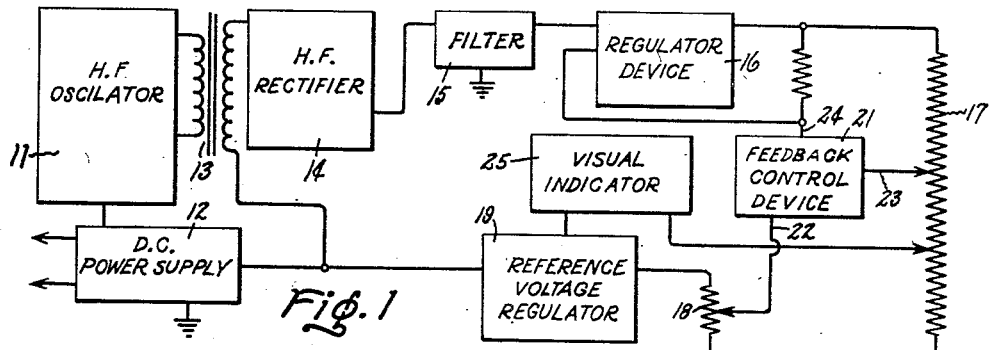
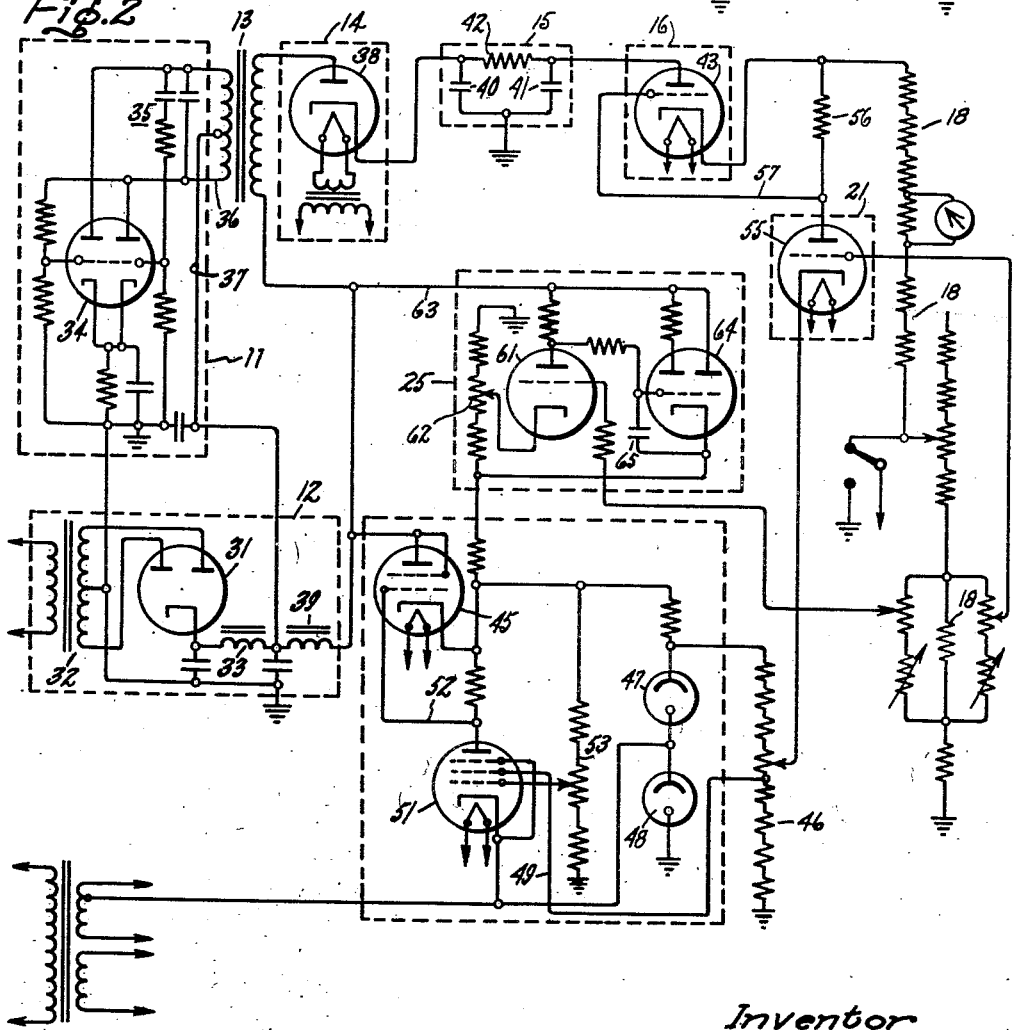
Inventor
Buren W. Rechnitzer
by Charles W. Helzer
His Attorney United States Patent Office 2,815,479
Patented Dec. 3, 1957

2,815,479

HIGH VOLTAGE SUPPLY

Buren William Rechnitzer, Delmar, N. Y., assignor to General Electric Company, a corporation of New York Application June 1, 1954, Serial No. 433,340

4 Claims. (Cl. 321—2)

The present invention relates to an electrical power supply circuit. More specifically, the invention relates to a high voltage power supply circuit that is suitable for use with precision instruments such as a mass spectrometer.

While there are a large number of well-known electrical power supply circuits available, many of these known circuits are unsatisfactory for use with precision instruments because of their inability to provide highly stable output voltages over a wide range of output voltage values, and for maintaining good regulation over the entire range of output values. Additionally, many of the known power supply circuits tend to drift from their preset values because of defects inherent in their design. In order to provide a power supply circuit which overcomes these objections, the present invention was devised.

It is, therefore, one object of the present invention to provide a high voltage power supply circuit which is capable of providing an extremely stable output voltage.

Another object of the invention is to provide a high voltage power supply circuit which is capable of maintaining good regulation over a wide range of output voltage values.

A still further object of the invention is to provide a high voltage power supply circuit which eliminates the need for dry cell batteries therein as a source of reference potential, and thereby overcomes drift in the value of the output voltage caused by the changes in the reference potential supplied by such dry cell batteries with changes in ambient temperature.

In practicing the invention a power supply circuit is provided which includes a source of alternating electric energy and a rectifier coupled to the source of alternating electric energy for converting the same to direct current electric energy of a high value. A variable impedance regulating device connected in series circuit relationship with the output of the rectifier, and a load impedance is connected in series with the variable impedance regulating device and the output of the rectifier. A source of reference electric potential is included in combination with the above-described elements, and a feedback control device having two input terminals and one output terminal is supplied. One of the input terminals of the feedback control device is connected to the source of reference electric potential, and the remaining input terminal is connected to the load impedance. The output terminal of the feedback control device is connected to the input of the variable impedance regulating device.

Other objects, features, and many of the attendant advantages of this invention will be appreciated more readily as the same becomes better understood by reference to the following detailed description, when considered in connection with the accompanying drawings, wherein like parts are identified by the same reference character, and wherein:

Fig. 1 is a schematic block diagram of the high voltage power supply circuit constructed in accordance with the invention; and, Fig. 2 is a detailed circuit diagram of the high voltage power supply circuit shown schematically in Fig. 1 of the drawings.

As is shown in Fig. 1 of the drawings, the high voltage power supply circuit includes a source of alternating current preferably comprising a high frequency oscillator 11 energized from a rectifying means formed by a first power supply rectifier 12. The output of high frequency oscillator 11 is coupled to the primary winding of a voltage step-up transformer 13 having the secondary winding thereof connected to the input of a high frequency rectifier 14 and to the power supply 12. The output of the high frequency rectifier 14 is coupled through a filter circuit 15 and through a variable impedance regulating device 16 across a load impedance 17 that preferably comprises a plurality of series connected resistors. Also included in the high voltage power supply circuit is a separate source of reference electric potential which preferably comprises a variable resistor 18 energized from the D.-C. power supply circuit 12 through a reference voltage regulator device 19 that is connected in series electrical relationship with the resistor 18 and the D.-C. power supply 12. A feedback control device 21 having two output terminals 22 and 23, and one output terminal 24, is provided. One of the input terminals 22 of control device 21 is connected to the movable contact of the variable resistor 18 and the remaining input terminal 23 connected to the load impedance 17 with the output terminal 24 connected back to the input of the variable impedance regulating device 16.

Briefly stated, the operation of the high voltage power supply circuit shown schematically in Fig. 1 is as follows: a 60 cycle 115 volt A.-C. electric energy is supplied from a standard source to the D.-C. power supply 12 which serves to convert the same to a low voltage direct electric current. This low voltage direct electric current is supplied to the high frequency oscillator as a plate supply voltage and to energize the component parts thereof. The high frequency oscillator 11 operates to provide a high frequency output voltage which is stepped up in value by a voltage step-up transformer 13 coupled to the output of the high frequency oscillator. The secondary winding of the voltage step-up transformer 13 is maintained at some predetermined direct current amplitude level by reason of the direct connection to the output of the direct current power supply 12, and the high frequency high value alternating current potential supplied thereto is superimposed on this direct current signal. Composite electric signal is rectified by the high frequency rectifier 14 filtered by filter 15 and fed through the variable impedance regulating device 16 to the load impedance 17 from which the highly stable, high voltage D.-C. potential may be obtained. To assure the stabilization of the D.-C. potential thus derived, a portion of the potential is fed back through the connection 23 to the feedback control device along with a reference potential supplied to the feedback control device by the source of reference electric potential supplied through the connection 22. The reference potential and a portion of the output stabilized direct current signal fed back through connection 23, are compared by the feedback control device, and any variation appearing therethrough is applied to the regulator device 16 by the connection 24 so as to compensate for such variation. In this manner, the circuit operates to maintain a highly stable output voltage. The value of this output voltage may readily be changed by controlling the value of the potential supplied by the high frequency oscillator 11, or by any other well-known means, without in any manner affecting the regulation provided by the feedback control device 21 and the variable impedance regulator device 16. Additionally, since the control voltage fed back through connection 23 is compared to a reference potential obtained from the resistor 18, and the reference potential across resistor 18 is itself derived through a separate reference voltage regulator device 19, the value of the output voltage remains at some preset point without drifting therefrom as there are no dry cell elements which are adversely affected by changes in ambient temperature, humidity and other environmental conditions that tend to adversely affect the regulation of the circuit. Also, if desired a visual indicator device 25 may be included in the circuit and connected between the reference voltage regulator 19 and the resistor 17 for providing an indication of the amount of regulation required.

A more detailed illustration of the invention is shown in Fig. 2 of the drawings, wherein it is seen that the first rectifier 12 comprises a conventional full wave rectifier including a duo diode 31 connected to the secondary winding of an input transformer 32, and to an output filter circuit 33 constructed of a network of capacitances and inductances. The rectifier 12 serves to energize the high frequency oscillator 11 which may comprise a conventional resistance-capacitance push-pull oscillator of the type disclosed on page 500 of Radio Engineers Handbook, F. E. Terman, author, McGraw-Hill Book Co., 1943. The oscillator 11 includes a duo triode 34 having the plates of each of the triode sections thereof interconnected through a tuned circuit 35 which includes the primary winding 36 of the voltage step-up transformer 13. The plate of each triode section is interconnected through a series connected capacitor-resistor circuit to the control grid of the opposite triode section, and a grid bias network is connected in the common cathode circuit of each of the triode sections. Plate potential is supplied to each of the anodes of the triode section through a connection 37 between the mid tap point of the secondary winding transformer 13 and the rectifier 12 so that upon energization of the oscillator circuit, the same operates to generate high frequency oscillation in a conventional push-pull manner.

The high frequency oscillations developed by the oscillator 11 are supplied by the voltage step-up transformer 13 to the high frequency rectifier 14. The high frequency rectifier 14 comprises a single diode 38 which has the anode thereof connected to the secondary winding of the step-up voltage transformer 14 and is maintained at a relatively high D.-C. level by reason of the application of a D.-C. bias applied thereto from the power supply rectifier 12 through a filter choke 39. This direct current bias with the alternating current potential supplied by the voltage step-up transformer 13 is rectified by the diode 38, and the resulting, pulsating direct current wave is smoothed out by the filter circuit 15 which includes a pair of parallel connected capacitors 40 and 41 having a resistor 42 connected therebetween. The filter 15 is connected to the output of the diode 38, and is connected in series circuit relationship with the variable impedance regulating device 16 which preferably comprises a triode tube 43. The triode 43 has the anode thereof connected to the output of the filter circuit 15, and the cathode thereof connected to a load impedance 18 which preferably comprises a string of series connected resistors some of which are of constant value, and some of which are variable in construction. By reason of this connection, the high voltage direct current electrical signal available at the output of the filter circuit 15 is supplied across the load impedance 18 through the regulator tube 43. Any desired value of stabilized direct current electrical voltage can then be obtained from across the load impedance 18 by connecting an output circuit across an appropriate portion of the load impedance.

A separate source of stable reference voltage also comprises a part of the power supply circuit, and includes a second variable impedance regulator device comprising a pentode tube 45 having the plate thereof connected to the output of the rectifier 12 through the 60 cycle choke coil 39, and having the cathode thereof connected in series electrical relationship with a reference load resistor 46. Load resistor 46 is connected in parallel circuit relationship with a pair of gas discharge tubes 47 and 48, which preferably comprise neon tubes. A portion of the voltage appearing across resistor 46 is fed back through a conductor 49 to the screen grid of a second feedback control pentode tube 51 having the plate thereof connected through a plate load resistor to the cathode of the voltage regulator tube 45. The voltage appearing across the plate load resistor of the feedback control tube 51 is supplied through a conductor 52 to the control grid of the series regulator tube 45. The control grid of the pentode feedback control tube 51 is connected to a resistor voltage divider which is connected in parallel with the reference load resistor 46 and the neon glow tubes 47 and 48, and serves to provide a comparison potential to the control grid of the feedback control tube 51 which is compared with the value of the reference voltage fed back across the conductor 49 to the screen grid. Should variations occur in the relationship between the two voltages such variations cause a difference in conduction through the series feedback regulator tube 45 to thereby compensate for such variation. In this manner, an extremely stable reference potential is obtained across the load resistor 46.

A main feedback control deivce 21 is provided which preferably comprises a triode 55 having the cathode thereof connected to the reference resistor 46, and the control grid thereof connected to the load impedance 18. Hence, the feedback control device 21 could be said to have two input terminals, one of which is connected to the refernce resistor 46 and the other to the load impedance 18. The plate of the diode 55 is connected through a plate load resistor 56 to the high voltage end of impedance 18, and through a conductor 57 to the control grid of the series regulator tube 43. By connecting the main feedback control device 21 in this manner, the output supply voltage appearing across the load impedance 18 is compared to the reference potential picked off the reference resistor 46, and any variation between the two causes a difference in current flowing through the triode tube 55 to thereby affect the plate potential of the tube. Variations in the plate potential of the feedback conrol tube 55 causes a variation in the bias applied to the control grid of the series regulator tube 43 so as to cause the same to conduct more or less current, and thereby compensate for variations in the supply potential appearing across the load impedance 18. Because the reference potential appearing across resistor 46 is itself controlled to a very fine degree, the comparison of the reference potential obtained from resistor 46 to a portion of the potential appearing across load impedance 18 in the main feedback control device 21 with consequent regulation by the series regulator tube 43, effectively improves stabilization of the potential appearing across the load impedance 18 to an extremely high degree. In addition to the circuit structure already described, the visual indicator 25 may be included in the power supply circuit for the purpose of providing a visual indication of the condition of stability of the circuit during operation. A suitable form of a visual indicator is shown in the diagram of Fig. 2 and preferably comprises a first triode tube 61 having the cathode thereof connected to a predetermined point on a voltage divider 62 connected between the cathode of voltage regulator tube 45 and ground. The control grid of the triode tube 61 is connected to a predetermined point on the load impedance 18, and the plate thereof is energized from the D.-C. power supply 12 to a suitable plate supply conductor 63. The output of the triode tube 61 is connected to the control grid of a "Magic Eye" indicator tube 64 which is illustrated schematically as a duo-triode having a common cathode. This tube has the cathode and the control grid thereof connected through a capacitor 65, and the anodes thereof connected in common to the D.-C. power supply 12 through the conductor 63. By this arrangement, variations occurring in the potential appearing across load impedance 18 are effectively compared to the reference potential appearing across the reference resistor 46 so that variations from a predetermined value are indicated on the "Magic Eye" tube 64, and can readily be observed by an observer. If desired, further modifications may be made without substantially altering the basic structure of the invention. One such modification would be the provision of two separate power supplies in place of the single power supply 12 illustrated. Such a second power supply could be used to separately energize the reference resistor 46 through the series regulator tube 45, and by such construction the stabilization of the circuit could further be improved.

From the foregoing description, it can be appreciated that the invention provides a high voltage power supply circuit which is capable of providing extremely stable direct current output voltages, and which is capable of maintaining good regulation of the output voltages over a wide range of output voltage values. Additionally, because the circuit does not require dry cell batteries or the like, the circuit does not tend to drift from preset values due to aging of the components thereof.

Obviously, other modifications and variations of the present invention are possible in the light of the above teachings. It is, therefore, to be understood that changes may be made herein which are within the full intended scope of the invention as defined by the appended claims.

What I claim as new and desire to secure by Letters Patent of the United States is:

1. A power supply circuit including in combination a source of alternating electric energy, a rectifier adapted to be coupled to said source of alternating electric energy for converting the same to direct electric energy, a first variable impedance regulating device connected in series circuit relationship with the output of said rectifier, a load impedance connected in series with said first regulating device and the output of said rectifier, a source of direct current electric energy, a second variable impedance regulating device connected in series circuit relationship with said source of direct current electric energy, a resistor for providing a reference voltage connected in series circuit relationship with said second regulating device and the source of direct current electric energy, a gas discharge device connected in parallel circuit relationship with said resistor, an electron discharge device having the input thereof operatively connected to said resistor and the output thereof connected to the input of said second variable impedance regulating device, and a main feedback control electron discharge device having two input terminals and one output terminal with one input terminal connected to said resistor and the remaining input terminal connected to said load impedance and with the output terminal connected to the first variable impedance regulating device.

2. A power supply circuit including in combination a source of high frequency alternating electric energy, a rectifier coupled to a source of alternating electric energy for converting the same to direct electric energy, a grid controlled regulating tube connected in series circuit relationship with the output of said rectifier, a first load resistor connected in series with said regulating tube and the output of said rectifier, a source of direct current electric energy, a second grid controlled regulating tube connected in series circuit relationship with said source of direct current electric energy, a second resistor for providing a reference voltage connected in series circuit relationship with said second regulating tube and the source of direct current electric energy, a gas discharge device connected in parallel circuit relationship with said second resistor, a grid controlled electron discharge device the input thereof being operatively connected to said second resistor and the output thereof being connected to the input of said second variable impedance regulating device, and a main feedback grid controlled electron discharge device having the cathode thereof connected to said second resistor and the control grid thereof connected to said first load resistor and with the anode thereof connected to the control grid of said first regulating tube.

3. A high voltage power supply including in combination a first rectifier for providing relatively low value direct current electric energy, a high frequency oscillator operatively connected to said first rectifier for converting the direct current electric energy to a high frequency alternating electric energy, a step-up transformer coupled to the output of said oscillator, a second rectifier connected to the secondary of said step-up transformer for converting the high value alternating electric potential provided thereby to a high value direct electric potential, a first variable impedance regulating device connected in series circuit relationship with the output of said second rectifier, a load impedance connected in series with said first regulating device and the output of said second rectifier, a second variable impedance regulating device connected to said first rectifier, a resistor connected in series circuit relationship with said second regulating device and said first rectifier, a gas discharge device connected in parallel circuit relationship with said resistor, an electron discharge device having the input thereof operatively connected to said resistor and the output thereof connected to said second variable impedance regulating device, a feedback control electron discharge device having two input terminals and one output terminal with one input terminal being connected to said resistor and the remaining input terminal being connected to said load impedance and with the output terminal connected to said first variable impedance regulating device.

4. A high voltage power supply including in combination a first rectifier for providing relatively low value direct current electric energy, a high frequency oscillator operatively connected to said first rectifier for converting the direct current electric energy to a high frequency alternating electric energy, a step-up transformer coupled to the output of said oscillator, a second rectifier connected to the secondary of said step-up transformer for converting the high value alternating electric potential provided thereby to a high value direct electric potential, a first grid-controlled regulating tube connected in series circuit relationship with the output of said second rectifier, a first load resistor connected in series with said first regulating tube and the output of said second rectifier, a second grid-controlled regulating tube connected to said first rectifier, a second resistor for providing a reference potential connected in series circuit relationship with said second regulating tube and said first rectifier, a pair of series connected gas discharge devices connected in parallel circuit relationship with said second resistor, a grid-controlled electron discharge tube having the control grid thereof operatively connected to said second resistor and the anode thereof connected to the control grid of said second grid-controlled regulating tube, and a grid-controlled feedback control electron discharge device having the cathode thereof connected to said second resistor and the control grid thereof connected to said first load resistor with the anode thereof connected to the control grid of said first regulating tube.

References Cited in the file of this patent

UNITED STATES PATENTS

| | | |
|---|---|---|
| 2,301,343 | Tarr | Nov. 10, 1942 |
| 2,377,500 | Johnson | June 5, 1945 |
| 2,456,638 | Kenyon | Dec. 21, 1948 |